(No Model.)
S. W. SMITH.
FARM GATE.
No. 330,631. Patented Nov. 17, 1885.
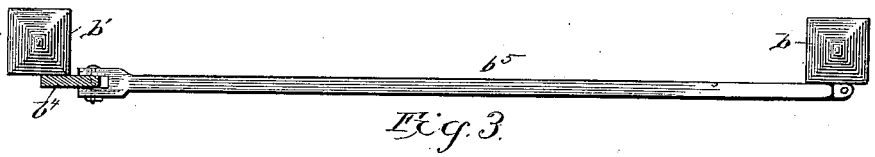
Fig. 3.
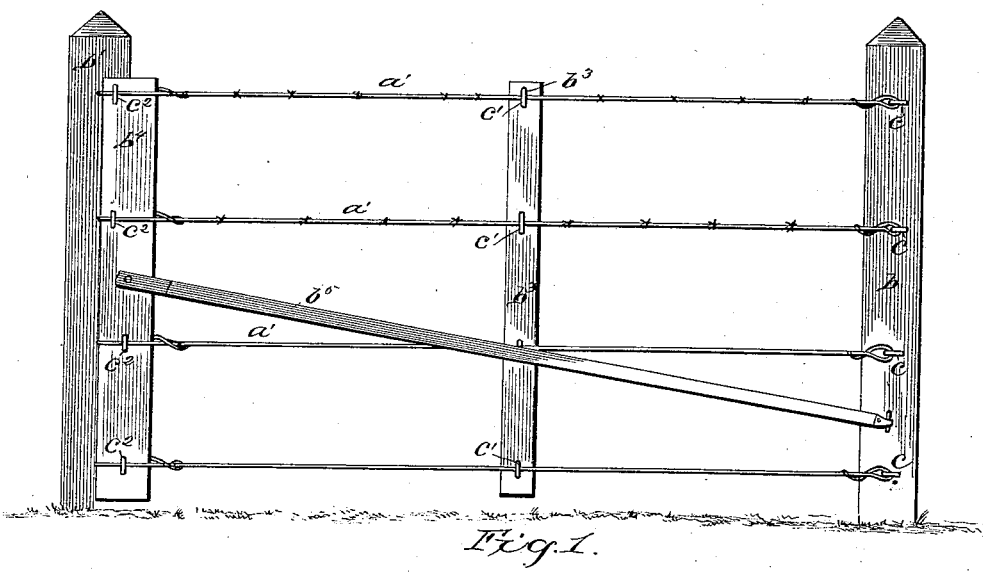
Fig. 1.
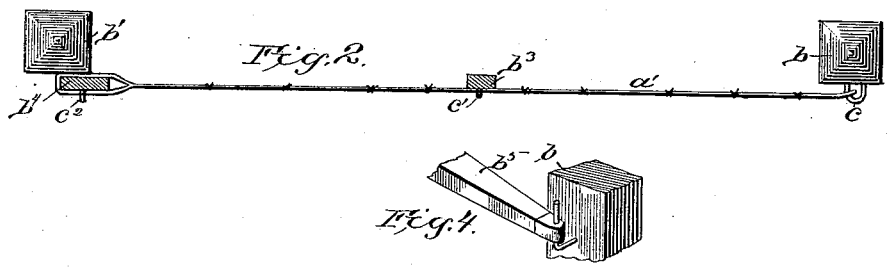
Fig. 2.
Fig. 4.
WITNESSES
Jos. A. Ryan
Wm. D. King
INVENTOR
Seth W. Smith
by Chas. E. Barber
Attorney
for Risley Love & Perry

UNITED STATES PATENT OFFICE.

SETH W. SMITH, OF PARIS, NEW YORK.

FARM-GATE.

SPECIFICATION forming part of Letters Patent No. 330,631, dated November 17, 1885.

Application filed August 30, 1884. Serial No. 144,835. (No model.)

*To all whom it may concern:*

Be it known that I, SETH W. SMITH, a citizen of the United States, and a resident of the town of Paris, in the county of Oneida and State of New York, have invented a new and useful Improvement in Farm-Gates; and I do hereby declare the following to be a full, clear, and exact description of the same, reference being had to the accompanying drawings, and to the letters and figures marked thereon.

My invention relates to a novel and simple method of constructing a farm-gate and the supports thereof, designed for use with wire fences when the gate is formed of wires placed horizontally, one end held rigidly to an upright, and the opposite end hinged to a post set in the ground, and the gate supported by a single brace.

It consists of the combination and arrangement of the several parts, as hereinafter more fully described.

In the accompanying drawings, Figure 1 is a front view of my improved gate. Fig. 2 is a top view of the same. Fig. 3 is a top view of the brace. Fig. 4 is a perspective view of a portion of the post and the cross-brace.

Having described my invention in reference to the figures illustrated in the accompanying drawings, I will now proceed to describe the same by reference to the letters marked thereon, in which similar letters of reference refer to corresponding parts throughout the several views.

$a'$ represents ordinary barbed wire, forming cross-bars of the gate.

$b$ represents a gate-post inserted in the ground.

$b'$ is an ordinary stationary gate-post, one end placed in the ground at the opposite side of the opening in the fence from $b$.

$c\ c\ c\ c$ represent four staples or eyebolts, inserted in stationary post $b$ at suitable distances apart. The cross bars or wires $a'\ a'\ a'\ a'$ are inserted in these eyebolts and twisted around upon themselves to secure the cross bars or wires in these staples, thus forming hinges on which the gate swings when opened or closed.

$b^3$ is a center upright or stay post, to which the horizontal bars $a'\ a'\ a'\ a'$ are attached by staples $c'\ c'\ c'\ c'$. There may be several posts $b^3$, or the one may be omitted without interfering with the usefulness of my invention.

$b^4$ represents the upright end post of the gate, to which cross-bars $a'\ a'\ a'\ a'$ are attached and held rigidly by the staples $c^2\ c^2\ c^2\ c^2$, or by other suitable means to hold them rigidly. This post forms a part of the gate, and moves with it when opened or closed.

$b^5$ represents a brace, one end pivoted on stationary post $b$, above the bottom wire at or near the lower portion of the stationary post, and the opposite end held rigidly on upright end post, $b^4$, at a higher point on the same than on the stationary post, thereby forming a brace to keep the gate in a horizontal position and give strength to the same when in use, as indicated in Fig. 1.

By the use of my improved gate a great saving is made in expense, as it costs less to construct it, is simpler, and more durable than any other gate. All dragging on the ground is avoided, no matter what the length of the gate may be. It is lighter and more easily opened and closed than those now known or in use.

It will be observed that by the use of a single rigid bar placed diagonally across the gate, pivoted to the rigid post at the rear at a point above the bottom wire, and secured about centrally between the top and bottom of the vertical post at the front end of the gate, all sagging of the gate is prevented, as the rigid bar thus forms a fulcrum-bearing for the vertical front post, and the wires being of a different length from the rigid bar, and practically non-elastic, the gate cannot be moved up or down at its outer free end.

I am aware that wire gates have been made resembling mine in some particulars, and having two diagonal braces, one of which is pivoted below the bottom wire of the gate and rigidly secured to the top of the vertical end post at the front of the gate; but this is not what I claim, and has not the advantages which my gate has, but operates in a different manner from mine. I am not aware that a single rigid brace has been used in this connection and secured to the gate in the novel manner shown and described; and What I therefore claim, and desire to secure by Letters Patent, is—

The farm-gate above described, consisting of the vertical end post, $b^4$, having the wires $a'\ a'\ a'$, rigidly secured thereto at their outer ends, and pivotally secured at their opposite ends to the fixed post $b$, in combination with the single rigid brace $b^5$, secured at its outer end midway between the top and bottom of the post $b^4$, and extending diagonally across the wires, and pivoted at its opposite end above the pivotal point of the bottom wire on the post $b$, whereby the gate is made rigid and practically incapable of being raised or lowered, substantially as described, and for the purposes explained.

Dated and signed at Utica, New York, this 28th day of August, 1884.

SETH W. SMITH.

Witnesses:
EDWARD NORRIS,
ORLANDO J. CHILDS.